(12) United States Patent
Zimmermann et al.

(10) Patent No.: US 6,820,709 B1
(45) Date of Patent: Nov. 23, 2004

(54) SPEED CONTROLLER FOR A MOTOR VEHICLE

(75) Inventors: Uwe Zimmermann, Ludwigsburg (DE); Michael Scherl, Asperg (DE); Michael Weilkes, Sachsenheim (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 10/148,791
(22) PCT Filed: Oct. 17, 2000
(86) PCT No.: PCT/DE00/06342
§ 371 (c)(1), (2), (4) Date: Aug. 29, 2002
(87) PCT Pub. No.: WO01/40011
PCT Pub. Date: Jun. 7, 2001

(30) Foreign Application Priority Data

Dec. 4, 1999 (DE) .......... 199 58 520

(51) Int. Cl.[7] .............................. B60K 31/00
(52) U.S. Cl. ............ 180/169; 180/171; 701/96
(58) Field of Search .............. 180/169, 170, 180/171, 178, 179, 167; 123/349, 350, 399; 701/96, 93, 98, 110, 1

(56) References Cited

U.S. PATENT DOCUMENTS

| | | | | |
|---|---|---|---|---|
| 5,166,881 A | * | 11/1992 | Akasu | 701/96 |
| 5,495,251 A | * | 2/1996 | Gilling et al. | 342/70 |
| 5,749,426 A | * | 5/1998 | Gilling | 180/167 |
| 5,771,481 A | * | 6/1998 | Gilling | 701/93 |
| 5,839,534 A | * | 11/1998 | Chakraborty et al. | 180/169 |
| 5,899,289 A | * | 5/1999 | Uematsu | 180/168 |
| RE36,470 E | * | 12/1999 | Woll et al. | 342/71 |
| 6,076,622 A | * | 6/2000 | Chakraborty et al. | 180/169 |
| 6,116,369 A | * | 9/2000 | King et al. | 180/169 |
| 6,233,516 B1 | * | 5/2001 | Egawa | 701/96 |
| 6,385,527 B1 | * | 5/2002 | Zumberge et al. | 701/91 |
| 6,400,308 B1 | * | 6/2002 | Bell et al. | 342/71 |
| 6,456,230 B2 | * | 9/2002 | Schwartz et al. | 342/71 |
| 6,560,525 B1 | * | 5/2003 | Joyce et al. | 701/96 |
| 2004/0010362 A1 | * | 1/2004 | Michi et al. | 701/93 |

FOREIGN PATENT DOCUMENTS

| | | |
|---|---|---|
| DE | 39 28 045 | 3/1990 |
| DE | 196 46 104 | 4/1998 |
| DE | 199 24 142 | 11/2000 |
| EP | 0 992 387 | 4/2000 |
| EP | 1 065 090 | 1/2001 |
| WO | WO 00 59752 | 10/2000 |

* cited by examiner

Primary Examiner—Christopher P. Ellis
Assistant Examiner—J. Allen Shriver
(74) Attorney, Agent, or Firm—Kenyon & Kenyon

(57) ABSTRACT

A cruise controller is provided, which regulates the driving speed of the vehicle not only beyond a certain minimum speed but also at speeds below a preselected critical speed down to standstill of the vehicle. Detecting the traffic situation using a distance sensor allows the vehicle to be automatically started once the driver has responded to a corresponding starting instruction. The starting instruction is effective until a preselected time limit, but, alternatively may also be repeated. However, in any traffic situation, the driver may override the cruise controller by operating the accelerator pedal or the brake pedal.

14 Claims, 5 Drawing Sheets

SPEED CONTROLLER FOR A MOTOR VEHICLE

FIELD OF THE INVENTION

The present invention relates to a cruise controller having a distance sensor for controlling the speed or acceleration of a vehicle.

BACKGROUND INFORMATION

It is believed that cruise controllers, with which a desired driving speed is preselectable, are known, including cruise controllers that regulate the speed as a function of a vehicle driving ahead. For example, German Published Patent Application No. 196 46 104 describes a device for selecting and displaying speeds, including a first control unit for regulating the speed and/or acceleration of a vehicle. A second control unit controls the display of the instantaneous speed and the preselected desired speed. This cruise controller also operates as a function of a distance regulator (ACC, adaptive cruise control) and regulates the driving speed of the vehicle in accordance with a vehicle driving ahead. This system functions satisfactorily if the driving route is relatively free and it is possible to drive without interruption, e.g., on a rural road or a highway. However, if there are areas of traffic congestion or if the speed drops below a preselected limit, the cruise controller shuts down, thereby forcing the driver to manually regulate his driving speed according to the prevailing traffic situation. Drivers may not be able to use this cruise controller in a stop-and-go operation, for example, when starting and braking in a low speed range.

SUMMARY OF THE INVENTION

It is believed that an exemplary cruise controller according to the present invention has the advantage over the related art in that it may also operate in stop-and-go operation, therefore eliminating the need for starting and braking, which may annoy the driver, e.g., when driving in a queue. For example, it is believed that this cruise controller may advantageously permit automatic starting of the vehicle from a standstill, for example, if the traffic situation allows, either automatically or after being enabled by the driver.

The status for stop-and-go mode may be displayed. Therefore, the driver may retain an overview over the instantaneous functionality of the cruise controller and may decide whether to intervene or whether to allow the cruise controller to respond to stationary objects, for example.

It is believed that the instantaneous status of the cruise controller in stop-and-go mode may be advantageously displayed by a simple display element or signal lamp. Thus, the driver need not concentrate on other lamps, while nevertheless advantageously retaining a full overview.

Since the driver should always retain the uppermost functional power over the performance of the vehicle in all driving situations, the command for automatic starting of the vehicle to the control may be delivered by operating a stop-and-go button. The driver may thus check again to determine whether the current traffic situation may permit automatic starting of the vehicle.

To prevent automatic starting of the vehicle due to accidental operation of the stop-and-go button, the readiness for automatic starting may be shut off after a preselected period of time.

The control may repeatedly deliver a new starting instruction for the driver, so that the driver will have enough time to respond to the prevailing traffic situation.

Another signal lamp may be provided for the status of the control in the ACC mode. The additional signal lamp, for example, may be equipped with three status messages for stop-and-go operation, like the signal lamp. Therefore, the driver retains a clear arrangement of signal lamps and may be able to familiarize himself rapidly with the operating status of the cruise controller without any great learning effort.

The driver should be able to cancel the instantaneous operating state of the cruise controller by operating the brake, so that control of the vehicle is retained.

The individual operating elements of the cruise controller are only actively operable if the respective signal lamp has previously been in the intermediate status. This may make it easier to avoid mistakes in operation.

DETAILED DESCRIPTION

Figure 1:
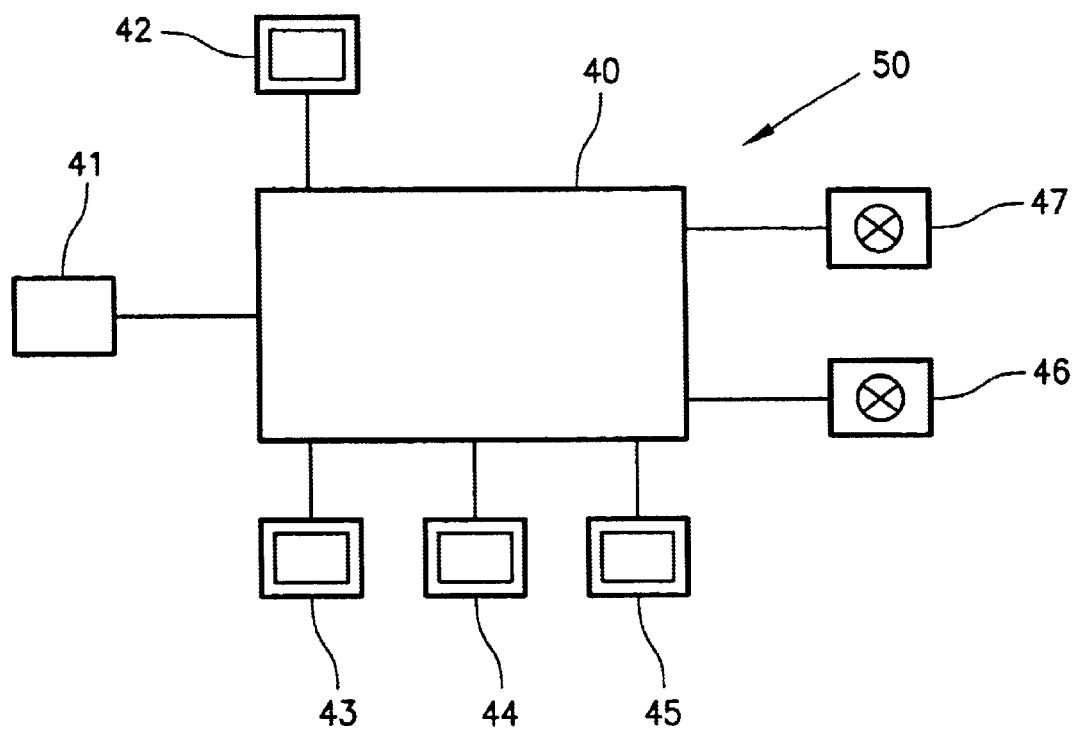
FIG. 1 is a block diagram showing the basic design of a cruise controller.

The block diagram in FIG. 1 shows the basic design of a cruise controller 50. The central unit is a control 40, which is connected to a distance sensor 41. Distance sensor 41 may be, for example, a radar sensor that works with microwaves or an optical sensor that monitors the driving range in front of the vehicle with respect to stationary obstacles, oncoming vehicles and vehicles driving ahead, and delivers the corresponding information to control 40. Control 40 is connected by a corresponding interface to various vehicle components, such as engine control and transmission control, brakes, etc. These units are not shown in FIG. 1 for reasons of simplicity. In its individual components, control 40 may be regarded as a cruise controller like that referred to in German Published Patent Application No. 196 46 104, for example. As such, no further explanation is provided. Control 40 is also connected to operating elements, such as buttons or switches. A known cruise controller may have, for example, an on/off button 42, one + button and one − button 43 for selecting the last speed set and a resume button 44 for restoring the set driving speed. An object of an exemplary embodiment according to the present invention is to provide an additional button, i.e., stop-and-go button 45. The exact function of this button in conjunction with the other buttons is explained in detail below. It should be noted that suitable switches or operating elements may be used instead of the buttons.

For providing the driver with information, control 40 includes display elements 46 for the ACC mode and 47 for the status in stop-and-go mode. Additional displays for the operating function of control 40 may also be added, for example.

However, the number of display and operating elements should be kept as low as possible to prevent a complicated learning procedure for the driver, and the operation should be simple enough so that it does not constitute a safety risk. Signal lamps 46 and 47 therefore alternatively display three functions. In one exemplary embodiment, the three states are signal lamp on, signal lamp off and signal lamp having a weakened luminous power or a different color from the on state. Alternatively, three different colors, e.g., red, green and yellow or similar embodiments may also be selected.

To explain the functioning of the embodiments, the nature of the invention should first be explained again. A known cruise controller (FGR) may be active only above a first critical speed v1. Thus, the controller regulates the driving speed only when it has reached critical speed vi (active or activatable ACC mode). Also, in city traffic, for example, distance sensor 41 may not always know exactly which targets it must consider, e.g., when driving in a queue and with extremely short intervehicle distances, e.g., at streetlights and intersections. However, cruise control is much simpler on rural roads and highways, where speeds are higher but the distances and thus the vehicle density are lower, because it is easier to anticipate the driving behavior of the other drivers.

However, various exemplary embodiments according to the present invention may also regulate the speed range in effect from a standstill to a second critical speed v2 with an additional stop-and-go device at low speeds, such as occur in town traffic. This stop-and-go mode is below second critical speed v2 if the driver has not turned the system off, so that it automatically regulates its distance and driving speed.

For a better understanding, the essential features of the cruise controller are explained below.

1. In the ACC mode, i.e., in the speed range above critical speed v1, stationary targets are also detected, but the system does not respond to these targets. In stop-and-go mode, however, in the speed range less than v2, the cruise controller responds to both slow and stationary targets which are classified as relevant.

The speed range between speeds v1 and v2 may be important if v1 is less than v2. In this range, the driver may choose between the two active modes mentioned above, or alternatively may leave the choice to the cruise controller. This regulation advantageously provides a fluid transition between the two states, and the driver may determine the point in time for the change in state because the driver is informed regarding the prevailing status.

2. For stop-and-go mode, the following features are also provided. After reaching a standstill in regulated operation, automatic starting is possible up to a certain predetermined time limit $t_{limit}$ after stopping. Automatic starting is then possible only after being enabled by the driver.

3. In addition, at standstill, the cruise controller gives starting instructions when acquisition of the object data detects an end of the standstill situation. This may be the case, for example, when the distance from a vehicle driving ahead has increased or when a certain differential speed between the two vehicles has been determined. Only then is automatic starting possible within a certain period of time after being enabled by the driver.

4. In addition, in a first exemplary embodiment according to the present invention, if the starting instruction is disregarded, the cruise controller deactivates itself, and then the vehicle may be started only by the driver.

In a second embodiment according to the present invention, however, there is no automatic deactivation of the cruise controller. Instead, after a preselected period of time, the driver again receives starting instructions, if allowed by traffic conditions.

5. In addition, the driver should confirm a transition from a mode having a lower functionality, e.g., from a stop-and-go mode, for example, to the ACC mode. Supporting instructions by the cruise controller may also be possible.

6. In this exemplary embodiment, the operating elements and displays are arranged clearly and their functions are readily understandable for the driver. Therefore, the driver has a general overview of the system.

7. All the operating elements have the same functionality in each mode to simplify operation.

8. The same is also true of the display elements, which actively inform the driver regarding the prevailing operating status, e.g., stop-and-go mode, so that the driver retains an overview of which states are feasible.

9. It may be important that any active control mode may be overridden or turned off by the driver at any time.

Figure 2:
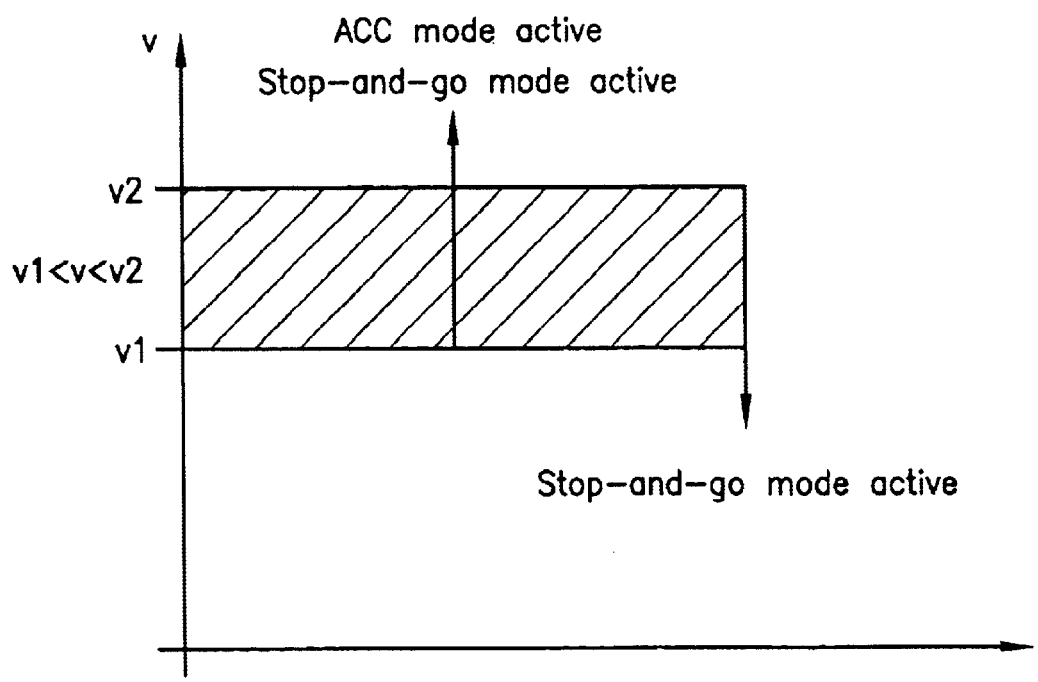
FIG. 2 is a diagram showing the speed range for which a speed v2 is greater than a speed v1.

FIG. 2 shows a diagram for the speed range for which speed v2 is greater than speed v1. The arrows show the two ranges in which the ACC mode or the stop-and-go mode is active or may be activated. Transition range v1<v<v2 is shown with hatching.

Two embodiments of the present invention are explained in greater detail with reference to FIGS. 3 and 4. These two embodiments are examples of cruise controllers that essentially fulfil features 1 through 9 mentioned above.

Figure 3A:
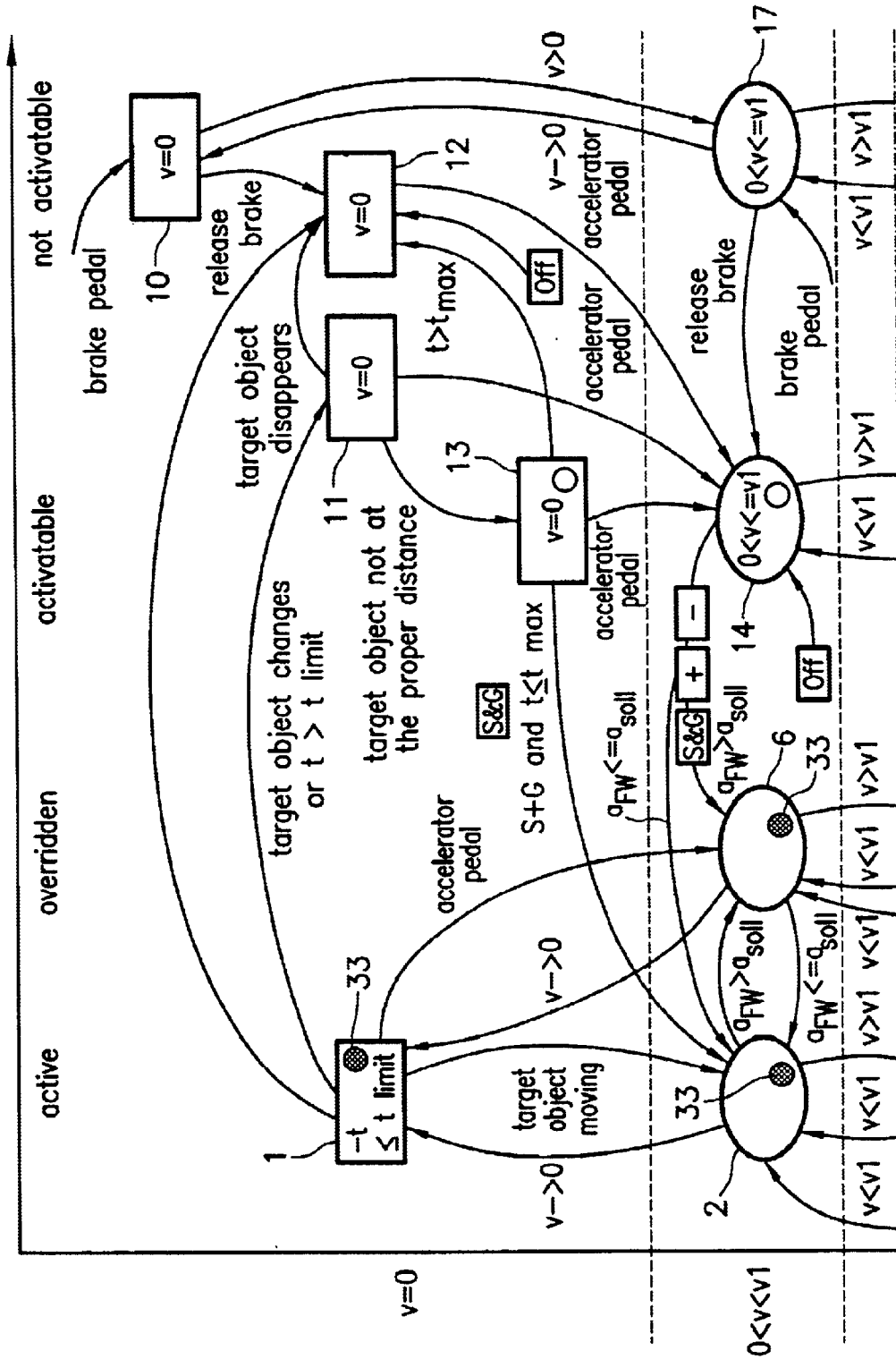
FIG. 3 is a state diagram showing the function of a first exemplary embodiment according to the present invention.
Figure 3B:
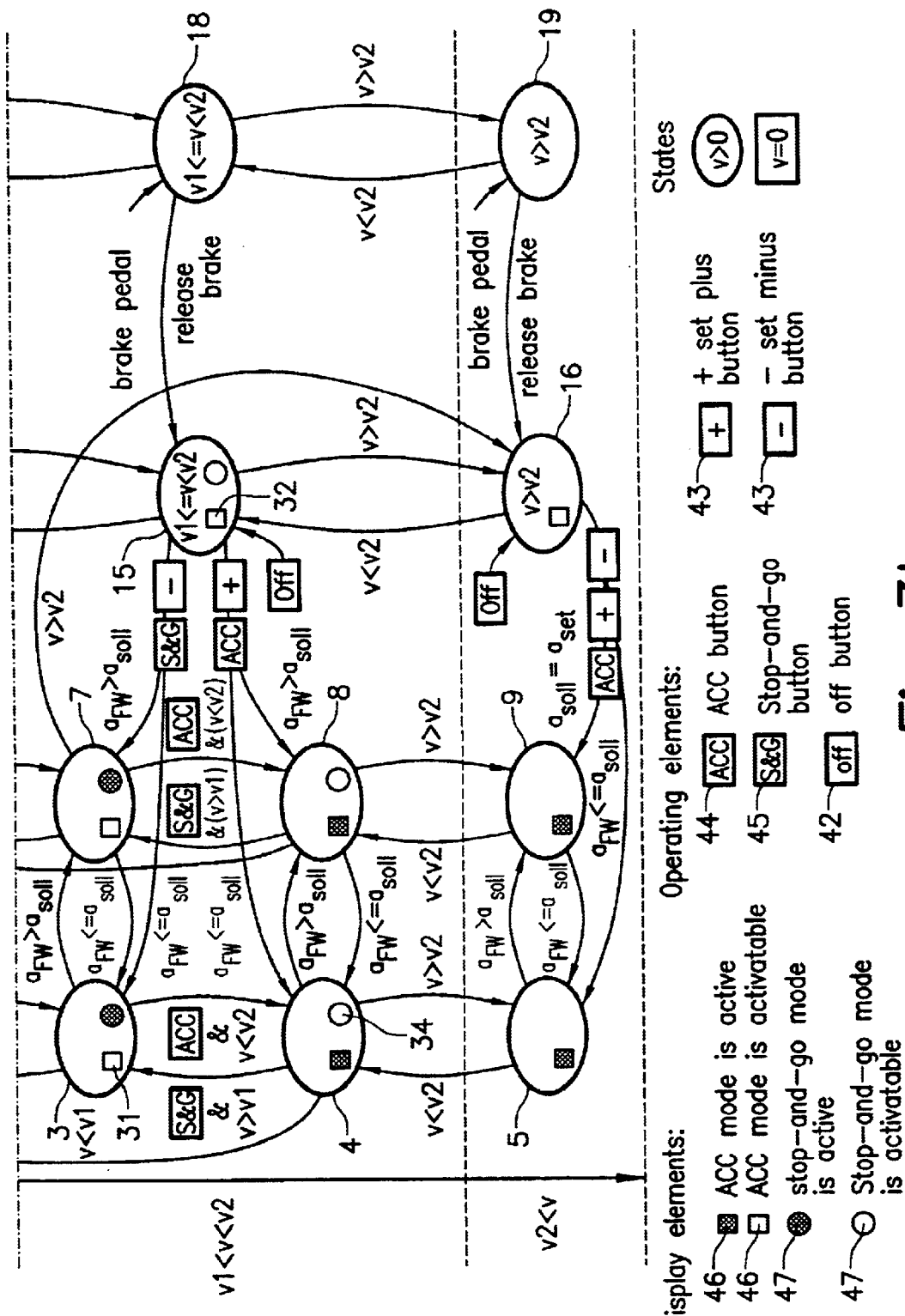
Figure 4A:
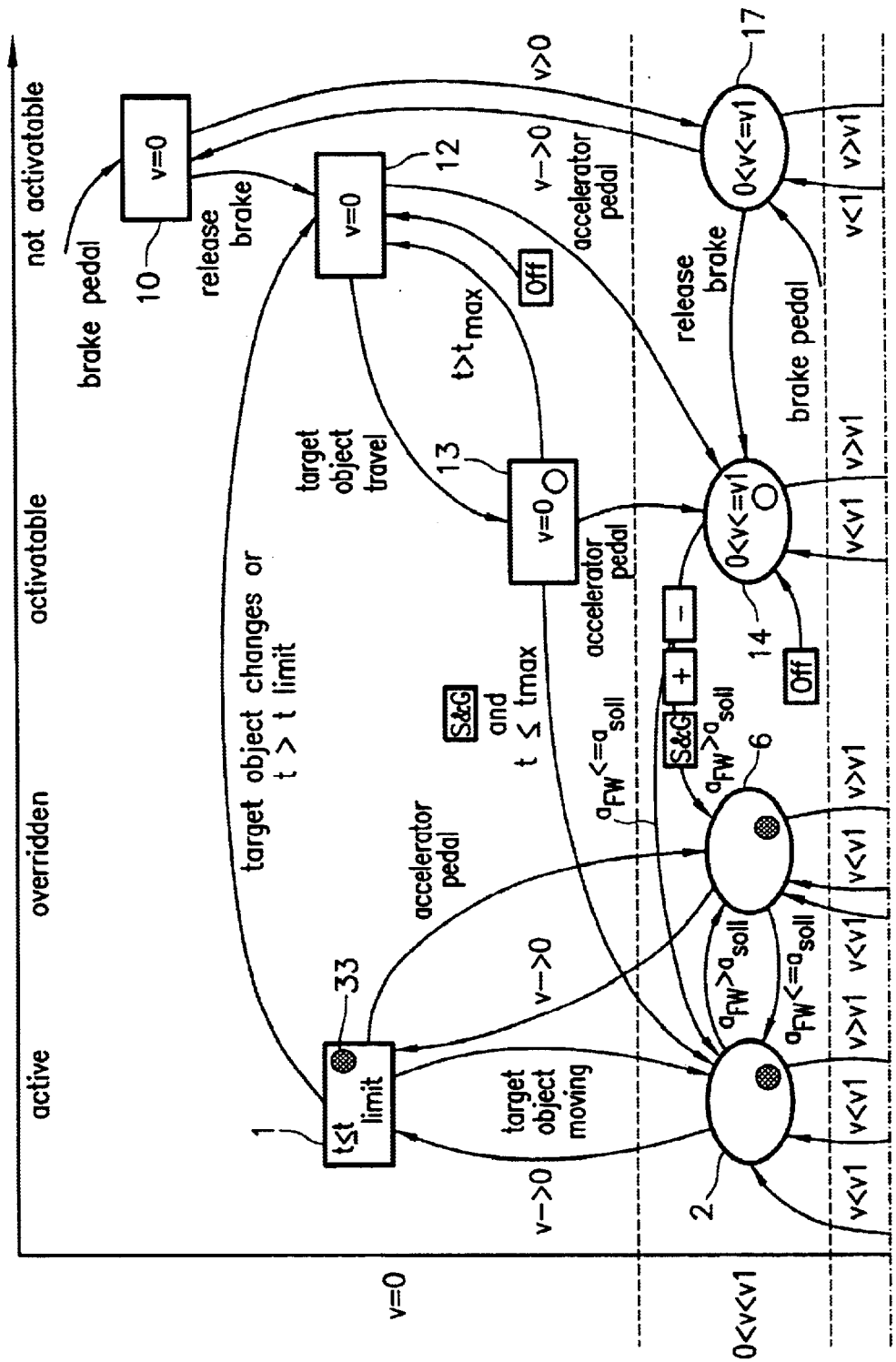
FIG. 4 is a state diagram showing the function of a second exemplary embodiment according to the present invention.
Figure 4B:
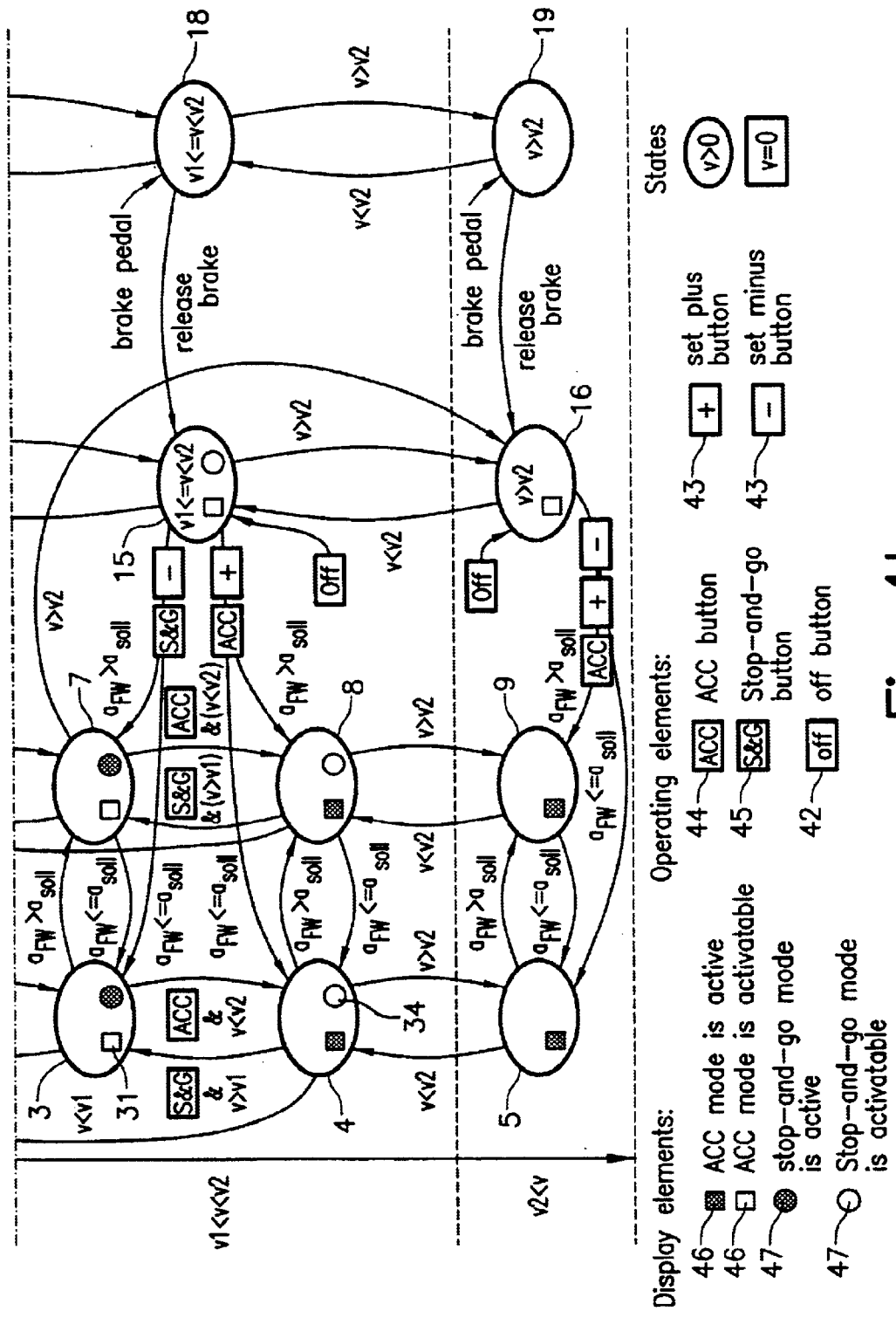

The first exemplary embodiment according to the flow chart in FIG. 3 is explained in greater detail first. It should be noted that FIG. 3 is based on the intensity of the driver's intervention (horizontal axis at the upper edge of the page): "active," "overridden," "activatable," "not activatable." Velocity "V=0," "0<V<v1,". "v1<V<v2" and "v2<V" are plotted on the vertical axis on the left side, from top to bottom. In addition, the different symbols for signal lamps 46 and 47 for the various ACC modes and stop-and-go modes are shown at the lower edge of FIG. 3. In addition, operating elements 42 through 45 with their functions are also shown. Likewise, the state symbols are shown.

For reasons of simplicity, all transitions from the active state to an inactive state, which may always be triggered by operation of the off button or the brake pedal, are also shown in FIG. 3, but are not shown in their course. Only the condition to which such an operation leads is shown for each speed level. This exemplary embodiment uses operating and display elements of conventional cruise controllers, so that no excessive relearning effort is necessary for the driver.

The cruise controller has been expanded by adding signal lamps 46 and 47 and stop-and-go button 45.

Signal lamp 46 for the distance regulator (ACC mode) may assume three operating modes:

The ACC lamp is off, i.e., the functionality of control 40 is neither active nor activatable here.

The ACC lamp is turned on: the system is in ACC mode, i.e., the ACC controller is active.

The ACC lamp is in an intermediate state (e.g., the lamp burns faintly, or in the case of a surface display element, only the border is shown or another color change is discernible): the ACC mode is not active, but it may be activated by the driver by operation of the ACC button.

Signal lamp 47 for stop-and-go mode has also been designed for three functions accordingly:

The stop-and-go lamp is off: the functionality of the stop-and-go regulator contained in control 40 is neither active nor activatable.

The stop-and-go lamp is on: the system is in stop-and-go mode, i.e., the stop-and-go regulator contained in control 40 is active.

The stop-and-go lamp is in an intermediate state (like signal lamp 46): the stop-and-go mode is not active, but it may be activated by the driver by operation of stop-and-go button 45.

For example, an acoustic signal may be provided as the starting instruction if the system detects a situation in which the system functionality may be approached accordingly and preselected time limit $t_{max}$ for automatic starting has not yet elapsed. This occurs when the system has braked to a standstill. Simultaneously, the driver is visually instructed by signal lamp 47, with its intermediate state, that cruise controller 50 is now activatable.

The function of the additional operating elements are explained below. ACC button 44 (known as a resume button) causes the ACC mode to be activated when the driver operates this button if signal lamp 46 is in the intermediate state.

The +/− buttons determine which actions will be implemented, depending on the status of the system. If the cruise controller is active, i.e., if one of signal lamps 46 and 47 lights up, then the set speed is incremented or decremented by a certain amount, e.g., 10 km/h. However, if the cruise controller is only activatable (signal lamp 46 and 47 is in an intermediate state), then the corresponding mode is activated. The set speed is set at the next higher or lower mark relative to the prevailing speed. However, if both modes are activatable (both signal lamps 46 and 47 are in an intermediate state), operation of the + button causes the ACC mode to be activated. However, operation of the − button causes the stop-and-go mode to be activated. Cruise controller 50 is deactivated by operating on/off button 42.

Stop-and-go button 45 enables the driver to activate the stop-and-go mode if signal lamp 47 is in the intermediate state.

In another exemplary embodiment according to the present invention, the buttons and the signal lamps are either mounted separately from one another or designed as modules.

With regard to the flow chart of FIG. 3, all the system states are represented either by rectangles or by ellipses.

Rectangles indicate that the vehicle is stationary and ellipses indicate that the vehicle is in motion. In addition, the status of two signal lamps 46, 47 are indicated. The transitions between the states are characterized with the respective buttons if the buttons may trigger the transitions. The transition is triggered by operation of one of these buttons.

The features mentioned above may be implemented on the basis of the flow chart in FIG. 3 for the first exemplary embodiment. If the vehicle stops behind a stationary target object (a vehicle driving in front) in active stop-and-go mode, the control goes to position 1 in which the stop-and-go mode remains active. The vehicle driving in front (target object) approaches within time $t_{limit}$. Then, automatic starting begins, with cruise controller being active in the stop-and-go mode (position 2) and the speed being regulated. Simultaneously, signal lamp 47 (position 33) lights up to display that the stop-and-go mode is active. If the speed is increased further until V>v1, then in position 3, lamp 31 also lights up (intermediate state) to signal that ACC mode is activatable. The driver may then choose to activate ACC mode (position 4) by operating button 44. Signal lamp 46 lights up and signal lamp 47 goes into the intermediate state (position 34). If the speed is increased further beyond critical speed v2, the ACC mode is active (position 5) and the system regulates the speed. Signal lamp 47 goes out.

If the driver, now in position 2, desires to influence the acceleration by depressing the accelerator pedal, then the driver is overriding the function of the stop-and-go mode (position 6). The speed of the vehicle is then increased beyond critical speed v1. In position 7, the driver further overrides the stop-and-go function, so that, with increasing speed, by selecting button 44, the system again goes to position 8, where the ACC mode is active and stop-and-go mode is activatable. Here again, the speed of the vehicle may be increased by pressing button 43 (position 9).

If the vehicle is stationary in position 1 for a period of time longer than preselected period of time $t_{limit}$, the system does not go into the active state (position 11). If the prerequisites for safe starting are met, then in position 13 the stop-and-go mode is switched to activatable and a starting instruction is issued. Signal lamp 47 is in the intermediate mode. Within preselected time limit $t_{max}$, the cruise controller may be activated and started by operating stop-and-go button 45, so that the flow chart may be continued to position 2. If there is no confirmation of the starting instruction by pressing the stop-and-go button within $t_{max}$, the system goes to the inactive state (position 12), in which it is possible to start only by operating the accelerator pedal. In any case, cruise controller 50 may be deactivated by operating on/off button 42. Depending on the driving speed, the system then goes to an inactive position 12, 14, 15 or 16. The display elements do not show an active state. However, activatability of the stop-and-go mode is indicated by the intermediate state of signal lamp 47 in position 14, activatability of the ACC mode is indicated by the intermediate state of signal lamp 46 in position 10, and activatability of both states (stop-and-go mode and ACC mode) is indicated by the intermediate state of both signal lamps (46 and 47) in position 15. By operation of the respective operating elements, it is then possible to switch back to an active state. Likewise, cruise controller 50 may be deactivated by operating the brake pedal at any time.

Depending on the driving speed, this leads to an inactive position 10, 17, 18 or 19. Both display elements 46, 47 indicate an inactive state and no activatability. Only after releasing the brake does the system return to position 14, 15 or 16, which indicate activatability and thus allow activation.

A second exemplary embodiment according to the present invention is described below with reference to FIG. 4. The second exemplary embodiment operates similarly to the exemplary embodiment described above, except that this embodiment differs only in that position 11 is not provided.

The other positions are identical. Thus, in the active standing mode, a new starting instruction is delivered (position 13) when preselected time $t_{max}$ has been exceeded. The driver may then decide whether to switch to active stop-and-go mode by operating stop-and-go button 45, to leave the system inactive or to drive forward by depressing the accelerator himself (position 14).

In summary, the essential features of these two embodiments are explained again below, based on features 1 through 9 described above.

1. The active ACC mode includes the states "ACC active, system regulating" (positions 4 and 5) and "ACC active, driver overriding" (positions 8 and 9) and it may be activated only above speed v1. Active stop-and-go mode includes the states "stop-and-go active, system regulating" (positions 2 and 3), "stop-and-go active, driver overriding" (positions 6 and 7) and "stop-and-go active, target object, v=0, $t \leq t_{limit}$" (position 1). Stop-and-go mode may be used in the speed range below v2. These two embodiments differ in that, in the second embodiment, activation at a standstill is also possible if the driver has braked to a standstill. In contrast, activatability is possible at a standstill in the first embodiment only if the system was active when stopping the vehicle. FIGS. 3 and 4 indicate that a transition to the other mode may be initiated by the driver in the speed range between v1 and v2 by operating the ACC or stop-and-go buttons. Signal lamps 46, 47 indicate the possibilities of a transition.

2. The mechanism described here includes the states "stop-and-go, system regulating" (position 2), "stop-and-go active, target object, V=0, T≦$T_{limit}$" (position 1), "active standing" (position 11, 12) and "stop-and-go activatable, V=0, starting instruction" (position 13).

3. The mechanism described occurs in the state "stop-and-go active, V=0, starting instruction" (position 13).

4. In the first embodiment, with a given starting instruction and after a preselected time limit $t_{max}$ has elapsed, the system is deactivated if it has not yet been activated by the driver, and the system may be switched back on again by the driver only after starting. In the second exemplary embodiment, the system remains in readiness if the starting instruction is disregarded and preselected time limit $t_{max}$ has elapsed, and it may optionally issue a starting instruction again and may then change to the activatable mode.

5. A transition from stop-and-go mode to ACC mode may be accomplished only by explicit operation of ACC button 44.

6. The states and the respective system functionalities are not dependent upon traffic situations.

7.+8. All the operating elements and display elements have the same function, regardless of the prevailing state.

9. FIGS. 1 through 4 illustrate the possibilities of overriding by a higher acceleration request on the part of the driver when the vehicle is moving or by operation of the accelerator pedal at a standstill. When the vehicle is moving, operation of on/off button 42 leads to a state in which the system is inactive but it remains activatable at any time.

When the vehicle is stationary, on/off button 42, in the second exemplary embodiment leads to a state in which the system is not directly activatable but may be activated only after a starting instruction. For the first exemplary embodiment, operation of on/off button 42 when the vehicle is standing still converts it to an inactive state in which activatability is no longer possible. On operation of the brake by the driver, the system is transferred at any time to the state in which it is not active and is not activatable as long as the brake remains operated.

What is claimed is:

1. A cruise controller for a motor vehicle, comprising:
a control arrangement for controlling one of a speed and an acceleration of the vehicle;
a distance sensor;
a display;
at least one operating element for inputting a desired speed; and
a display element operable to assume three different operating states for three corresponding functions of the control arrangement in the second operating mode, the three operating states including:
a display-element-off operating state, in which the second operating mode is not activatable,
a display-element-on operating state, in which the second operating mode is active, and
an intermediate state, in which the cruise controller is in an inactive state, but is activatable;
wherein the control arrangement controls the speed of the vehicle as an adaptive cruise control in a third operating mode, the third operating mode being active above a critical speed, and
wherein, in a first operating mode, the control arrangement controls the speed of the vehicle as a cruise controller, and in a second operating mode, the control arrangement at least one of: i) starts the vehicle from a standstill up to a preselected maximum speed, and ii) brakes the vehicle to a standstill.

2. The cruise controller according to claim 1, wherein the speed of the vehicle is controlled in the first operating mode only above a critical speed.

3. The cruise controller according to claim 2, wherein the critical speed of the first operating mode is lower than the preselected maximum speed of the second operating mode.

4. The cruise controller according to claim 1, wherein a current operating mode of the control arrangement is displayed to a driver at least one of visually and acoustically.

5. The cruise controller according to claim 1, wherein the control arrangement initiates automatic starting of the vehicle only after being enabled by a driver.

6. The cruise controller according to claim 5, wherein a stop-and-go button is provided, and wherein automatic starting is enabled by operating the stop-and-go button.

7. The cruise controller according to claim 1, wherein the control arrangement switches off a readiness for automatic starting of the vehicle after a preselected period of time has elapsed.

8. The cruise controller according to claim 1, wherein a starting instruction may be output for a driver.

9. The cruise controller according to claim 1, further comprising a second display element operable to display a status of the control arrangement in the third operating mode.

10. The cruise controller according to claim 1, wherein a current operating mode is canceled when signals are received from a brake.

11. The cruise controller according to claim 1, wherein the at least one operating element is operable for at least one of the second and third operating modes only when a respective display element is in the intermediate state.

12. The cruise controller according to claim 1, wherein the distance sensor includes one of a radar sensor and a light-optical sensor.

13. A cruise controller for a motor vehicle, comprising:
a control arrangement for controlling one of a speed and an acceleration of the vehicle;
at least one operating element for inputting a desired speed, wherein, in a first operating mode, the control arrangement controls the speed of the vehicle as a cruise controller, and in a second operating mode, the control arrangement at least one of: i) starts the vehicle from a standstill up to a preselected maximum speed, and ii) brakes the vehicle to a standstill; and
a display element operable to assume three different operating states for three corresponding functions of the control arrangement in the second operating mode, the three operating states including:
a display-element-off operating state, in which the second operating mode is not activatable,
a display-element-on operating state, in which the second operating mode is active, and
an intermediate state, in which the cruise controller is in an inactive state, but is activatable.

14. An operating-and-display system for a cruise controller of a motor vehicle, including a control arrangement for controlling one of a speed and an acceleration of the vehicle, a distance sensor, a display, at least one operating element for inputting a desired speed, in which the control arrangement controls the speed of the vehicle as a cruise controller in a first operating mode and, in a second operating mode, at least one of: i) starts the vehicle from a standstill up to a preselected maximum speed, and ii) brakes the vehicle to a standstill in a second operating mode, the system comprising:

a display element operable to assume three different operating states for three corresponding functions of the control arrangement in the second operating mode, the three operating states including:

a display-element-off operating state, in which the second operating mode is not activatable, a display-element-on operating state, in which the second operating mode is active, and an intermediate state, in which the cruise controller is in an inactive state, but is activatable.

* * * * *